UNITED STATES PATENT OFFICE.

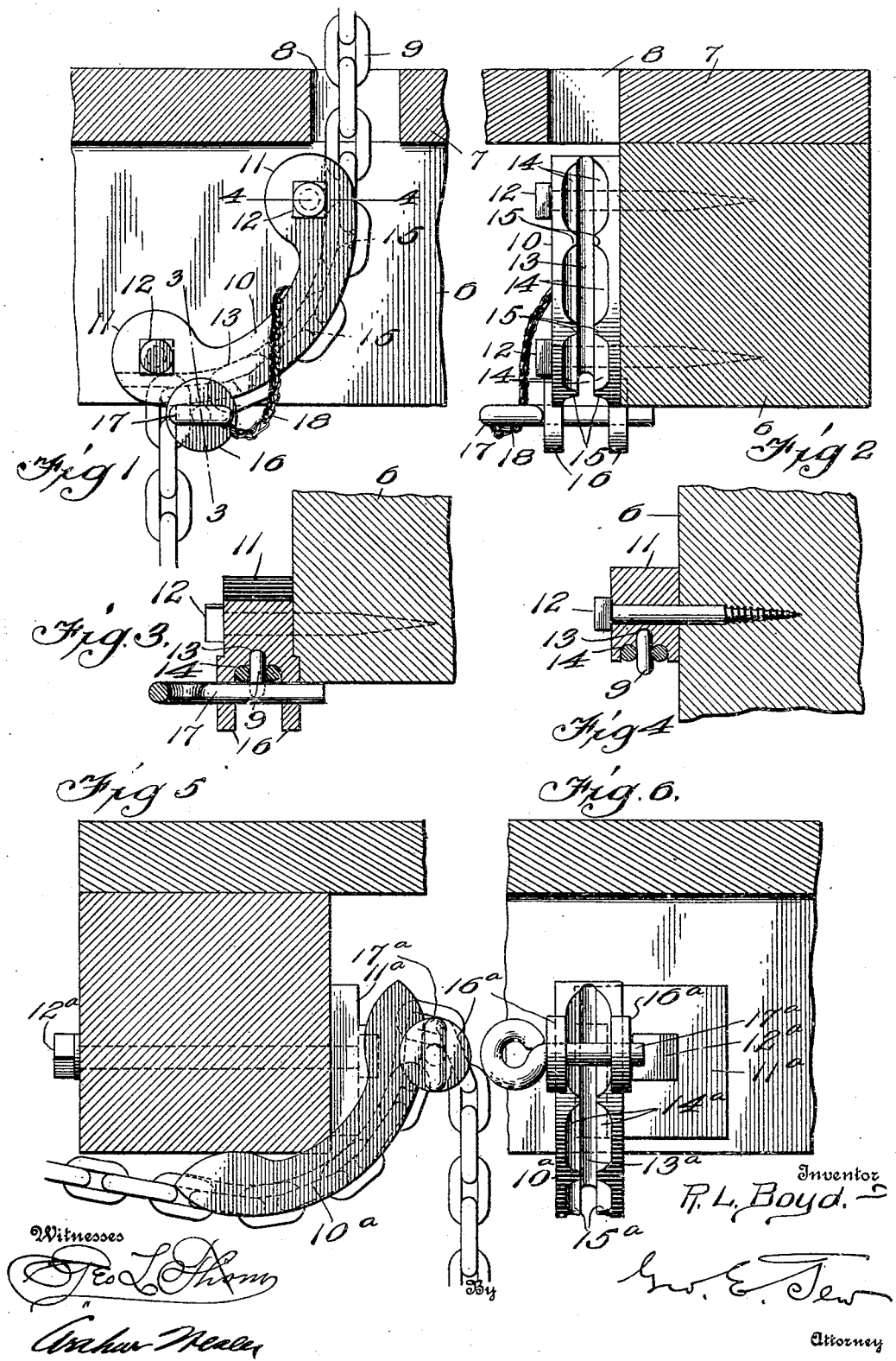

ROBERT LEE BOYD, OF ALEXANDRIA, LOUISIANA.

LOAD-BINDER.

No. 931,710. Specification of Letters Patent. Patented Aug. 17, 1909.

Application filed December 12, 1908. Serial No. 467,274.

*To all whom it may concern:*

Be it known that I, ROBERT LEE BOYD, citizen of the United States, residing at Alexandria, in the parish of Rapides and State of Louisiana, have invented certain new and useful Improvements in Load-Binders, of which the following is a specification.

This invention relates to binders and more particularly to that class used on flat cars, wagons, or the like, wherein chains are used to retain the load, such as logs, lumber, sugar cane or similar articles.

The objects of this invention are to form a secure and positive grip of the chain, at the same time to overcome the undue strain and possibility of breaking the chain at the point of attachment.

Further objects and advantages will be apparent from the following specification and drawing thereof in which—

Figure 1 is a side elevation of the device shown bolted to the inside face of a car sill. Fig. 2 is an edge view thereof. Fig. 3 is a section on the line 3—3 of Fig. 1. Fig. 4 is a section on the line 4—4 of Fig. 2. Fig. 5 is a side elevation of modified form showing the sill in cross section. Fig. 6 is an edge view of Fig. 5.

Referring specifically to the drawings, 6 indicates a car sill supporting the flooring 7, having an aperture 8 through which the chain 9 passes after having been drawn about the load to be bound.

A toggle in the form of the arcuate member 10 has enlarged ends 11, which are drilled to receive bolts or log screws 12 to bind the same to the sill. The outer surface of the toggle member is grooved as at 13, said groove being deep enough to allow the chain 9 to be embedded to about two thirds of the width of the links of said chain. At intervals the walls formed by the groove 13 are rabbeted as at 14 to receive the side members of the links of the chain 9 which lie in perpendicular planes to those occupying the groove 13, said rabbets forming shoulders 15 which bear the strain exerted thereon by the several links of the chain.

Near one of the enlarged ends 11 of the member 10 and integral therewith are lugs or ears 16 in which holes are formed to receive a pin 17, said pin being fastened to the arcuate member by chain 18 which prevents loss thereof. The holes in the ears 16 are so drilled or formed as to cause the pin 17 to cross outside of the chain 9 and between the ends of links lying in a parallel plane with respect to the side of the toggle, thereby holding the end of the chain in engagement with the recesses 14 and shoulders 15.

In Figs. 5 and 6 are shown views of a modified form of my invention, the arcuate member $10^a$ being similar with respect to the groove $13^a$, the recesses $14^a$ and the shoulders $15^a$, also ears $16^a$ and pin $17^a$ but the method of fastening consists of flap or portion $11^a$ formed integral with the member $10^a$ and bent at a right angle with respect thereto. A hole is drilled through the portion $11^a$ to receive the bolt $12^a$ which secures the member $10^a$ to the sill $6^a$. In this form the arcuate member $10^a$ is perpendicular to the sill while in my other form the member 10 is parallel to the sill.

In the use of my invention it will be assumed that one end of the chain is made fast to either a duplicate of my toggle or may be attached to the sill by any other means. The chain is drawn about the logs or the like to be bound, either passed through the aperture in the flooring or around and under the sill, as the case requires. The chain is drawn taut and placed into toggle, shoulders 15 sustaining the strain; then the pin 17 is placed through the ears 16, which pin prevents the chain becoming loosened or accidentally released. To release the chain the pin 17 is removed, the chain removed from the formations in the toggle member and the chain becomes loose.

I claim—

1. A chain holder for load binders, comprising a member having projections engageable with the links of a chain, means for holding the chain in engagement with the projections, and means for securing the member to a sill.

2. A chain holder for load binders comprising a member having a chain groove on its outer side to receive the links of a chain, and a pin engageable with said member to hold chain in the groove.

3. A chain holder for load binders comprising an arcuate member having ears spaced to receive a chain therebetween, a pin insertible through holes in said ears, to hold a chain to said member, between said ears.

4. A chain holder for load binders, comprising an arcuate member having a chain groove in its outer surface and perforated ears on opposite sides of said groove, and a pin which is insertible through the ears and across the groove to hold a chain therein.

ROBERT LEE BOYD.

Witnesses:
M. E. TURRIGANO,
LOUIS J. HAKENYOS.